Sept. 23, 1952     F. R. HARRIS     2,611,632
SHAFT COUPLING ASSEMBLY
Filed June 28, 1951
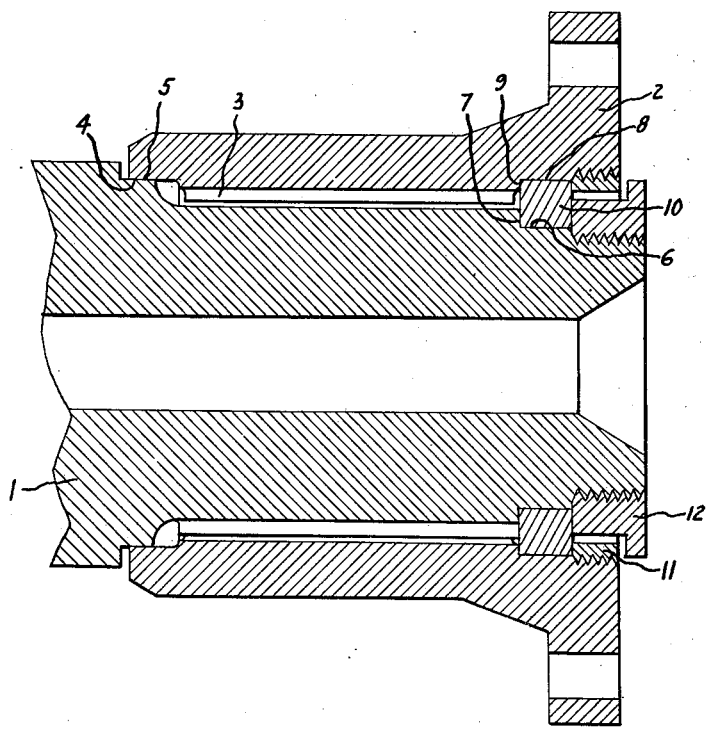
Inventor:
Frank R. Harris,
by *Ernest C. Britton*
His Attorney.

Patented Sept. 23, 1952

2,611,632

UNITED STATES PATENT OFFICE 2,611,632

SHAFT COUPLING ASSEMBLY

Frank R. Harris, Swansea, England, assignor to General Electric Company, a corporation of New York Application June 28, 1951, Serial No. 234,095
In Great Britain October 11, 1949

5 Claims. (Cl. 287—53)

1

This invention relates to shaft couplings in which an external sleeve member is mounted on a shaft or similar internal member, with cooperating axial splines transmitting torque between the members while concentricity is maintained by cooperating cylindrical lands located at each end of the splines.

In such couplings, in order that the external sleeve member may be assembled on the internal member, it is necessary that the diameter of the land remote from the free end of the shaft member shall be not less in diameter than the external diameter of the splines on the internal member, while the diameter of the land at the other end of the splines must be not greater in diameter than the internal diameter of the splines in the sleeve member. Previously in the manufacture of the internal and external members of such couplings, it has been necessary that the splines or serrations be formed by a slotting operation instead of a more convenient and accurate broaching process. Furthermore, since the splines were formed by a slotting operation, "runout space" had to be provided for the cutter, both on the internal and external members, with the result that the overall length of the coupling was increased for a given effective length of spline.

Accordingly, the purpose of the present invention is to provide an improved splined coupling assembly of the type described specially arranged to permit the splines on the external sleeve member to be formed by a broaching operation instead of slotting.

A further object is to provide a shaft coupling assembly of the type described so arranged that differential thermal expansion between the shaft and sleeve member, due to differences in temperature and in the coefficients of thermal expansion of the materials from which the respective members are made, will have a minimum effect in producing loosening of the sleeve on the shaft member.

Other objects and advantages will become apparent from the following description taken in connection with the accompanying drawing, in which the single figure represents a sectional view of a coupling assembly incorporating the invention.

Generally, the invention is practiced by providing at the free or outer end of the shaft member an annular recess in which is disposed a ring member, the outer circumference of which forms one land for maintaining the adjacent end of the sleeve concentric with the shaft. A shoulder on the shaft at the other end of the spline forms the other land for locating the other end of the sleeve.

Referring now more particularly to the drawing, the internal member is represented as a

2 shaft 1 and the external member as a flanged sleeve member 2 arranged in torque-transmitting relation with the shaft by means of axial splines 3. The left-hand end of the sleeve 2 is maintained concentric by engagement of a cylindrical surface 5 with a cylindrical shoulder or land 4 on shaft 1. It should be noted that the diameter of the surfaces 4, 5 is greater than the external diameter of the shaft splines, in order that the surface 5 will clear the splines, during assembly.

At the right-hand end of shaft 1, a cylindrical surface 6 is formed on the shaft 1 and is of smaller diameter than the root diameter of the shaft splines 3. Thus, there is formed an annular shoulder identified at 7 in the drawing.

The sleeve member 2 is recessed to provide a cooperating cylindrical surface 8 of a diameter not less than the root diameter of the splines in sleeve 2, and preferably somewhat greater than said root diameter so as to form a shoulder identified at 9.

A circumferential ring member 10 is disposed between the cooperating lands 6, 8 so as to hold the right-hand end of sleeve 2 coaxial relative to shaft 1. This ring is preferably secured in place in the sleeve member 2 as by being shrunk in place, but it may also be located more positively in the sleeve 2 by means of threaded retaining ring 11. The coupling sleeve 2 is located axially on shaft 1 by means of a second retaining nut 12 which threadedly engages the end of the shaft 1 and abuts against the outer end face of ring 10 so as to hold the latter firmly against the shoulder 7.

With this arrangement, splines 3 may be conveniently broached in sleeve member 2 prior to insertion of the ring 10. The cylindrical surfaces 5, 8 may conveniently be machined by mounting sleeve member 2 on a suitable splined mandrel.

Since the sleeve 2 is located axially on shaft 1 by abutments engaging the opposite faces of ring 10, the axial length over which differential thermal expansion can occur is only the axial thickness of ring 10 instead of the complete length of the splines (as would be the case where, in accordance with prior practice, the external sleeve is located axially by means of a locking nut at the free end of the coupling and by engagement of a radial face of the external member against a shoulder formed on the internal member at the other end of the splines). Consequently, the tendency of the assembly to loosen, due to differential thermal expansion between sleeve 2 and shaft 1 is considerably reduced. This is important as any looseness in the coupling introduces serious unbalanced forces and vibration problems in a high-speed rotor.

The location of the external sleeve member on the shaft by means of the ring 10 is particularly advantageous in internal combustion turbines where the internal member is the turbine rotor shaft. Rotors of such turbines are usually made of an austenitic material in order to withstand high temperature; whereas the external sleeve member is preferably made of a ferritic material, in the interest of cheapness and ease of manufacture. Due to the extreme heating of the rotor shaft during operation, by conduction of heat from the gas turbine bucket wheels, differential thermal expansion may cause the coupling sleeve to become loose on the shaft with the resulting possibility of vibration and fatigue failure of related parts.

In couplings incorporating the invention, the axial length over which this loosening action may take place is reduced to a small fraction of the total length of the coupling. For instance, in a typical example the coupling may be on the order of 6" long and subject to a temperature rise of 100° C., in which case the differential thermal expansion might be on the order of $3.6 \times 10^{-3}$ inches, whereas when the invention is used the resulting differential thermal expansion may be only on the order of $0.3 \times 10^{-3}$ inches.

While only one form of the invention has been described specifically, it will be apparent to those skilled in the art that numerous small changes may be made. For instance, as indicated above, the ring 10 may be retained in position in sleeve 2 only by a shrink fit, the retaining nut 11 being dispensed with. Likewise equivalent means for locking the ring 10 on the shaft 1 might be employed. It is also possible to form the ring 10 integral with the sleeve member 2, in which case the splines formed in the sleeve would still have to be formed by a slotting operation, although the other advantages described herein would be retained. It is, of course, intended to cover by the appended claims all such modifications as fall within the true spirit and scope of the invention.

What I claim as new and desire to secure by Letters Patent of the United States is:

1. A shaft coupling assembly comprising an inner cylindrical shaft member having a circumferential row of axial splines spaced from the free end of the shaft, the shaft defining between said free end and the splines a first external cylindrical surface of a diameter less than the root diameter of the splines, the shaft having at the opposite end of the splines a second external cylindrical surface of a diameter greater than the outside diameter of the splines, a coupling sleeve member with a circumferential row of axial splines engaging the shaft splines to transmit torque between said sleeve member and shaft, the sleeve member having a third internal cylindrical surface adjacent one end of the second row of splines and of a diameter greater than the root diameter of the splines on the sleeve member and a fourth internal cylindrical surface adjacent the other end of the splines and engaging said second cylindrical surface, a ring member disposed between said shaft and sleeve member with inner and outer circumferential surfaces in engagement with said first and third cylindrical surfaces respectively, means securing said ring member against axial displacement relative to the sleeve member, and means connected to the shaft end portion and engaging said ring member for retaining the latter against axial displacement relative to the shaft, whereby the splines serve only to transmit torque between sleeve member and shaft while concentricity is maintained by engagement of said second and fourth cylindrical surfaces and by the engagement of the ring member with said first and third cylindrical surfaces.

2. A shaft coupling assembly in accordance with claim 1 in which the ring member is fixed relative to the sleeve member by a retainer ring having external threads engaging the sleeve member.

3. A shaft coupling assembly in accordance with claim 1 in which the means for locking the ring member relative to the shaft comprises a lock nut having internal threads engaging the end portion of the shaft.

4. A shaft coupling assembly comprising an inner cylindrical shaft member having a circumferential row of axial splines spaced from the free end thereof and having between the splines and the free end of the shaft a first external cylindrical surface of a diameter no greater than the root diameter of the splines, the shaft having at the opposite end of the splines a second external cylindrical surface of a diameter not less than the outside diameter of the splines, a coupling sleeve member with a circumferential row of axial splines engaging said shaft splines in torque-transmitting relation, the sleeve member being secured to a circumferential member extending radially inwardly and forming a locating shoulder of limited axial length and a third internal cylindrical surface engaging said first cylindrical surface, the sleeve member having also at the other end of the splines a fourth internal cylindrical surface engaging said second cylindrical surface, and means connected to the shaft end portion and engaging said circumferential member for securing the sleeve member against axial displacement, whereby the splines serve only to transmit torque between said sleeve member and shaft while concentricity is maintained by engagement of said first and third and said second and fourth cylindrical surfaces respectively.

5. A shaft coupling assembly comprising an inner shaft member having a circumferential row of axial splines spaced from the end thereof and having between the splines and said end a first external substantially cylindrical surface of a diameter smaller than the root diameter of the splines, the shaft having at the opposite end of the splines a second external substantially cylindrical surface of a diameter greater than the outside diameter of the splines, a coupling sleeve member with a circumferential row of axial splines engaging said shaft splines in torque-transmitting relation, the sleeve member being secured to a circumferential member extending radially inward and forming a locating shoulder of limited axial length with a third substantially cylindrical internal surface engaging said first surface, the sleeve having also adjacent the other end of the splines a fourth internal substantially cylindrical surface engaging said second surface, and means connected to the shaft end portion and engaging said circumferential member for securing the sleeve member against axial displacement relative to the shaft, whereby the splines serve only to transmit torque between said sleeve member and shaft while concentricity is maintained by engagement of said first and third and said second and fourth surfaces respectively.

FRANK R. HARRIS.

No references cited.